Dec. 4, 1923.
H. K. PORTER
CUTTING TOOL
Filed Dec. 23, 1921
1,476,640
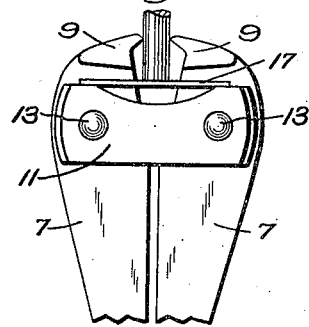
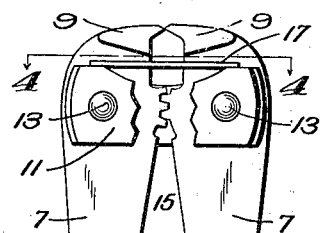
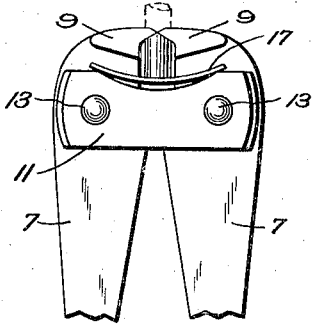
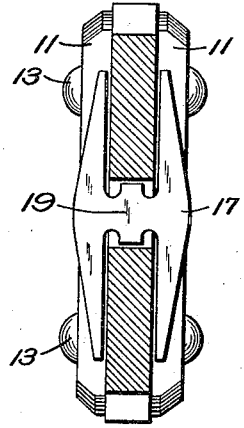
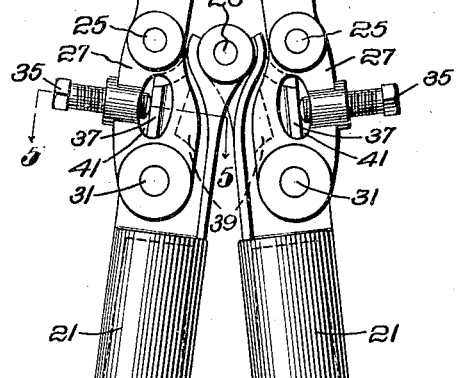
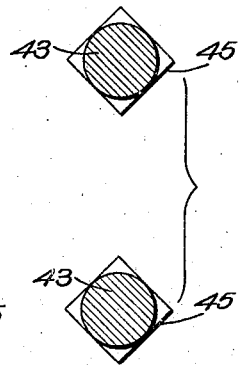
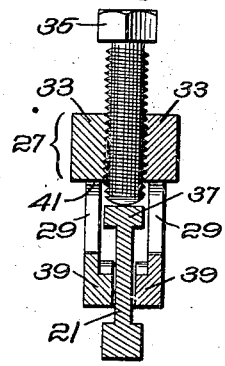
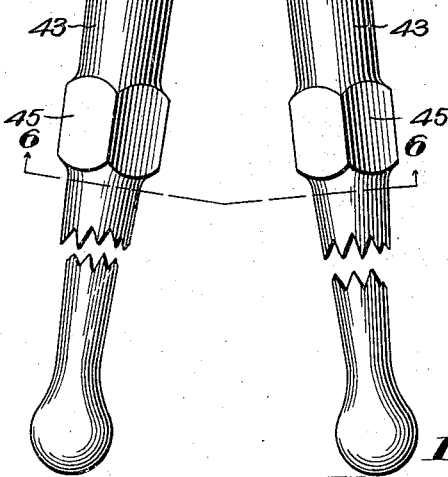
Inventor:
Henry K. Porter,
by Emery, Booth, Janney & Varney,
Attys.

Patented Dec. 4, 1923.

1,476,640

UNITED STATES PATENT OFFICE.

HENRY K. PORTER, OF BROOKLINE, MASSACHUSETTS.

CUTTING TOOL.

Application filed December 28, 1921. Serial No. 525,342.

*To all whom it may concern:*

Be it known that I, HENRY K. PORTER, a citizen of the United States, and a resident of Brookline, county of Norfolk, and State of Massachusetts, have invented an Improvement in Cutting Tools, of which the following description, in connection with the accompanying drawings, is a specification, like characters on the drawings representing like parts.

This invention relates to cutters and in its more specific aspect to a hand tool of the general type of nippers adapted to cut heavy wire, rivets or the like.

The invention will best be understood by reference to the following description of an illustrative embodiment thereof shown by way of example in the accompanying drawings, wherein:

Fig. 1 is a partly broken elevation of a pair of cutters;

Figs. 2 and 3 are similar views of the cutting jaws in successive positions during operation;

Figs. 4 and 5 are sections on an enlarged scale on the lines 4—4 and 5—5 of Fig. 1, respectively; and Fig. 6 is a section on the line 6—6 of Fig. 1.

Referring to the example of my invention shown in the drawings, I there show a tool embodying a pair of cutting levers or jaw members 7 having the working faces 9, which in the example shown are wedge-shaped cutting edges adapted to meet as shown in Fig. 1. The two levers 7 are pivoted together for conjoint action and in the present instance are connected by straps 11 on opposite sides of the same secured by pivot pins 13. The levers 7 may also be interconnected by the sector gearing 15 on their opposed faces.

An important feature of my invention is the provision of means for gaging the entrance of work between the cutting edges of the tool and preventing such work from coming into contact with the joint between the two levers which might cause difficulties. In the present instance, if work were inserted between the edges 9, 9 into the throat between the jaws of the tool, it might enter between the gears 15 and jam the tool or damage it. This is particularly the case in a tool such as shown wherein the wedge shape of the under faces of the working edges tends to draw down the portion of the work which is snipped off towards the joint between the levers. In accordance with my invention I provide a stop which will extend in the manner of a bridge across the throat of the tool at a point between the cutting edges 9 and the joint between the levers 7, represented in this instance by the plane containing the centers or the pivot points 13. This stop may conveniently take the form of a flat plate or leaf spring 17 (see Fig. 4) which has bifurcated end portions embracing the two levers, herein the jaws thereof, and a centrally connecting portion 19 between the two side portions at either side of the levers, which connecting portion is presented in the path of the work in the throat of the tool. The ends of the springs are conveniently supported on the end portions of the connecting straps 11 which are preferably elevated as shown in Fig. 1. Otherwise stated, the central portions of the straps are cut away to permit the central portion of the spring to yield downwardly.

The action of the parts will best be understood by reference to Figs. 2 and 3. In Fig. 2 a rod $w$ is shown entered between the edges 9 of the cutter with the end in contact with the spring 17. It will be seen that the end of the rod is stopped at a distance from the joint at 15 and that there is therefore no danger of jamming any of the parts. The tool is then operated to close the jaws and the parts then assume the position shown in Fig. 3. The action of the jaws presses the snipped off portion of the work $w$ inwardly and in so doing bends the spring 17, this being permitted by the fact that the latter is supported at its ends only by the elevated ends of the connecting straps 11. When the jaws are again released the spring aids in ejecting the snipped off piece.

The cutting levers 7 are operated by means of suitable operating levers 21 pivoted together at 23 and secured to the cutting levers at pivot points 25 preferably by connecting sections 27 which may be utilized as hereinafter more fully described for effecting certain adjustments. It will be understood that the three points 23, 25, 25 define a toggle by means of which the levers 7 are powerfully operated by the levers 21.

The form of connecting section 27 herein shown embodies various improvements. In the preferred form each section 27 comprises two substantially counterpart links 29, which may be quickly and cheaply produced by casting, and which are adapted to overlie on opposite sides a cutting lever 7 and an operating lever 21 and pivotally to connect the same, being pivoted to the former at the point 25 and to the latter at the point 31. Referring now to Fig. 5, the two links 29 preferably are provided with enlargements 33 which mate and form a back for the section extending over the edge of the operating lever 21 in the manner clearly shown in Fig. 5. The preferred form of connecting section whether made of two separate parts as in the example illustrated or in one piece is of a general U-shaped form having a back and two side portions which overlie the sides of the levers 21 and 7 and serve as links to connect the same.

The back of the connecting section, formed herein by the enlargements 33, presents to the edge of the lever 21 an abutment surface or stop means for limiting the swinging movement of the connecting section on the lever in one direction and this abutment surface is preferably made adjustable and for this purpose the enlargements 33 are tapped to provide a nut for an adjusting screw 35 which finds a bearing on the edge of the lever 21. Referring to Fig. 1, it will be seen that by movement of this screw the section 27 may be swung clockwise. This action tends to throw the cutting edges 9 together and by this adjustment wear of the edges may be compensated for.

My invention also provides suitable means for limiting movement of the connecting section in the opposite direction and for this purpose I utilize suitable cooperating abutments on the section and on the lever 21. In the example of the invention shown a portion of the lever 21 may be made of an I section, a construction not only advantageous in itself on account of the stiffness and the strength given to the lever but providing an edge flange 37 which may be utilized as an abutment in a manner hereinafter described. Suitable abutments are formed on the sides of the section 27 to cooperate with abutments on the lever 21 such as the edge flange referred to and preferably they are formed as projections 39, best shown in dotted lines in Fig. 1, on the inner faces of the side portions of this section and adapted to be inserted between the flanges of the lever 21 to play between the same and to cooperate with the edge flange 37 in limiting swinging movement of the connecting section 27 in a clockwise direction viewing Fig. 1. Particularly when the connecting section is made in two pieces 29 as herein disclosed, such pieces with the inner projections 39 are very readily and cheaply formed by casting and the pieces may be applied from the side to seat the projections 39 between the flanges of the lever 21 after which they are secured in position by means of the pivot pins 25 and 31.

Ordinarily the nut formed by the enlargements 33 and which is adapted to receive the adjusting screw 35 is tapped after the parts are assembled and when its separate pieces are thus held in proper position by means of the pivots 25 and 31. One or both of the links 29 are therefore preferably provided with transverse openings 41 which intersect the bore of the nut or communicate therewith closely adjacent the base thereof and provide for discharge of the borings during the tapping operation as the interior of the U-shaped section formed by the clamped together parts 29 is substantially filled by the levers 7 and 21 received within the same.

It is frequently desirable to use a tool of this character for cutting rods or wires which are charged with electricity and therefore insulated handles are provided for operating the levers 21. This may be conveniently effected by forming sockets in the levers 21 in which may be fitted wooden handles 43. To prevent the operative from unthinkingly grasping his tool near the pivotal point and by some metallic portion thereof I preferably provide a part of the wooden handles as 45 with asperities or roughnesses which will cut into the hands and either render a grip prohibitively uncomfortable or serve as a warning signal that the tool is improperly grasped. Herein these asperities are provided by the sharp corners of a square section of the handle. Such square portions also provide enlargements which tend to prevent the hand from slipping up on the handle in such a way as to come into contact with the metal parts of the tool.

I have described in detail the particular form of my invention shown by way of example in the accompanying drawings. It will be understood, however, that various features of construction, while shown in connection with a bifurcated nipping tool as shown, may be applied to other devices of the same general character and furthermore that they may be applied to tools having different types of working faces on the jaws 9 and levers pivoted together in other manner than as herein illustrated. The principles exemplified by the particular example shown which I claim as new and desire to secure by Letters Patent I shall express in the following claims.

Claims:

1. A tool comprising cooperating relatively swinging jaws and a flat spring having bifurcated ends embracing the jaws between their pivot points and working faces and having a central portion interposed between work entered into said jaws and the joints between them.

2. A tool comprising relatively swinging jaws, links arranged upon opposite sides of said jaws at their throats to permit conjoint movement of said jaws and an automatically adjustable yielding stop supported by both of said links at points adjacent to the pivots of said jaws, said stop having means transversely bridging said throat.

3. A tool comprising relatively swinging jaws having their pivot points connected by straps arranged at opposed faces of said jaws, portions of which support the ends of a leaf spring device provided with a portion transversely bridging the throat above the jaws between said straps at a distance from the plane of the pivotal centers of said jaws.

4. A tool comprising relatively swinging jaws having their pivot points connected by straps provided with raised end portions and a spring having bifurcated ends embracing the jaws and resting on said end portions.

5. A tool comprising relatively swinging jaws and a stop plate extending transversely of the throat of the tool having slots in which the jaws work.

6. A tool of the class described having swinging jaws connected at their throat by a pair of links for conjoint movement, and an automatically adjustable yielding stop supported by both of said links and transversely bridging said throat.

7. A tool of the class described having swinging jaws and an automatically adjustable yielding stop transversely bridging the throat of said jaws and supported at opposite sides of said jaws.

8. In a tool of the class described the combination with swinging jaws 9, of a stop having the portion 19 transversely disposed to the throat of said jaws, and yielding members at opposite sides of said jaws supporting said portion 19.

9. A tool of the class described comprising, in combination, a cutting lever, a pivoted operating lever, a connecting section pivotally connecting the levers, stop means for positioning said section against movement in one direction from one of said levers and projections on the opposed faces of said section and upon adjacent portions of said lever to limit movement in the other direction.

10. A tool as described in claim 9 wherein the connecting section is formed in two parts co-operating to support the stop means and between which two parts said stop means has screw adjustment.

11. A tool of the class described comprising, in combination, a cutting lever, a pivoted operating lever, one of said levers having an edge flange, a connecting section pivotally connecting the levers and comprising side portions embracing one of the levers, stop means for positioning the section against movement in one direction from said lever and projections on the inner face of said side portions cooperating with said flange to limit movement in the other direction.

12. A tool of the class described comprising, in combination, a cutting lever, a pivoted operating lever, one of said levers having an edge flange, a pair of links on opposite sides of said cutting lever and said operating lever pivotally connecting the same, stop means at the back of said links cooperatively supported thereby for moving them in one direction from one of said levers and projections on the inner faces of the links adapted to cooperate with the inside of the flange to limit movement in the other direction.

13. A tool of the class described comprising, in combination, a cutting lever, a pivoted operating lever, one of said levers having an edge flange, a section pivotally connecting said levers, stop means for positioning said section against movement in one direction from said one lever and an abutment on said section adapted to move over the face of said lever and to make contact with said flange to limit movement in the other direction.

14. A tool of the class described comprising, in combination, a cutting lever, a pivoted operating lever, a section of general U form having side portions pivoted to said levers to form links connecting the same, the bottom of said U presenting an abutment surface to one of said levers to limit movement of the section in one direction, the inner face of a said side portion presenting an abutment and a cooperating abutment on a lever to limit movement in the other direction.

15. In a tool of the class described, pivotally united operating elements each having a flanged outer edge adjacent to the pivot for said elements, pivoted jaws, two-part connecting sections for connecting said jaws with said operating elements, a lug upon at least one of the parts of said two-part connecting sections to cooperate with the flange at the edge of its respective operating element in limiting the pivotal movements of said connecting section in one direction with respect to its operating element, and a screw-threaded stop member carried jointly by the two parts of each of said connecting sections to engage the flange of the operating element adjacent thereto and limit relative movement of said connecting section opposite to the aforesaid direction, at least one part of each of said connecting sections having a transverse opening adjacent to the flange of its operating element.

16. In a tool of the class described, pivotally united operating elements each having flanged outer edges, pivoted jaws, two-part connecting sections for connecting said jaws with the operating elements, inwardly projecting lugs on said connecting sections to abut against said flanges and limit the outward swinging movements of said connecting sections relatively to said operating elements, enlargements formed upon adjacent portions of said two-part connecting sections, an adjusting screw jointly carried by the enlargements of each of said two-part connecting sections, said adjusting screws constituting stops for limiting the inward swinging movement of said connecting sections relatively to said flange, the parts of each of said two-part connecting sections having transverse openings adjacent to the inner ends of said enlargements and the adjoining portions of said flange.

17. In a device of the class described, a pair of operating elements, a pair of jaws, a two-part pivoting connecting section pivotally connecting each of said jaws with one of said operating elements, each of said connecting sections being of substantially U-form having sides embracing its respective jaw and operating element, an adjusting screw carried jointly by the backs of the parts of said connecting sections, at least one of said sides of each of said conecting sections having a transverse chip opening adjacent to the inner end of its screw.

18. In a device of the class described a pair of elements, links on opposite sides of said elements pivotally connecting the two, said links having opposed portions cooperatively forming a nut for an adjusting screw for engaging one of said elements, at least one of the links having a chip opening adjacent the inner end of the bore of the nut whereby tapping of said nut may be effected after assembling.

19. In a tool of the class described, pivoted handle levers, pivoted jaws, each of said jaws being connected to said handle levers by a pair of separate links, said links having edge portions abutting each other, said edge portions being provided with a screw-threaded opening, a screw-threaded member received in said opening to limit pivoted movement between said link and its handle lever and a stop carried by said tool cooperating with the screw-threaded member.

20. In a tool of the class described, pivoted handle levers, pivoted jaws, each of said jaws being connected to said handle levers by a pair of separate links, said links having edge portions abutting each other, said edge portions being provided with a screw-threaded opening, a screw-threaded member received in said opening to limit pivotal movement between said link and its handle lever, a stop carried by said tool cooperating with the screw-threaded member and an opening in the side of one of said links adjacent said stop.

21. In a nipper or like tool, relatively swinging jaws having transverse cutting edges and a freely arranged stop plate extending transversely of the throat of said swinging jaws and along opposite sides of said jaws to be engaged by the end of the work and to limit the insertion of said work between said jaws.

22. In a nipper or like tool having swinging jaws provided with transverse cutting edges, intermeshing teeth on said swinging jaws and a freely arranged stop plate extending transversely of the throat of said jaws between said cutting edges and said teeth and along opposite sides of said jaws to prevent the insertion of the work between said jaws into contact with said teeth.

23. In a tool of the class described, pivoted handle levers, each having a flanged portion adjacent the pivot thereof, pivoted jaws each being connected to one of said handle levers by a pair of links, at least one of said links having an inner projection to cooperate with the flange of its handle lever and to limit movement of said links in one direction relatively to its handle lever and an adjustable stop carried by said links to limit the movement of said links relatively to said handle lever in an opposite direction.

24. In a tool of the class described, a pair of handle levers pivotally connected together, pivoted jaws, each of said jaws being connected to one of said handle levers by a pair of separated links having inwardly projecting lugs to engage portions of their respective handle levers to limit pivotal movements of said links relatively to their handle levers in one direction and screw-threaded stop members carried jointly by the respective handle levers to limit pivotal movement of said links relatively to their handle levers in opposite directions.

In testimony whereof, I have signed my name to this specification.

HENRY K. PORTER.

Certificate of Correction.

It is hereby certified that in Letters Patent No. 1,476,640, granted December 4, 1923, upon the application of Henry K. Porter, of Brookline, Massachusetts, for an improvement in " Cutting Tools," an error appears in the printed specification requiring correction as follows: Page 4, line 106, claim 24, for the words " respective handle levers " read *links of each pair adapted;* and that the said Letters Patent should be read with this correction therein that the same may conform to the record of the case in the Patent Office.

Signed and sealed this 8th day of January, A. D., 1924.

[SEAL.] KARL FENNING,
*Acting Commissioner of Patents.*